Sept. 14, 1926.

C. J. PAGE 1,599,621

DRINKING FOUNTAIN FOR POULTRY

Filed Dec. 17, 1925  2 Sheets-Sheet 2

Inventor
C. J. Page
By C. A. Snow & Co.
Attorneys.

Patented Sept. 14, 1926.

1,599,621

UNITED STATES PATENT OFFICE.

CLAYTON J. PAGE, OF SALINA, KANSAS.

DRINKING FOUNTAIN FOR POULTRY.

Application filed December 17, 1925. Serial No. 76,076.

This invention relates to a drinking fountain for poultry and the object thereof is to provide a fountain having a separable drinking cup in connection with a peculiarly constructed feeding pipe and faucet, the fountain and cup being entirely separate so that dirty water cannot be washed back into the fountain, and the filling opening of which is so arranged and mounted so as to avoid stirring up of the water during the filling operation, or when feeding into cup.

Another object is to so construct a tank of this character with means for heating the water supplied to the poultry and to prevent freezing of the water in the tank, the heat being supplied directly to water in the cup so that it is not necessary to heat the entire contents of the tank directly, the water in the cup being kept warm while the contents of the tank is just kept above freezing.

Another object of the invention is to so construct the automatic feed to the cup so that the water will be supplied from the tank to the cup and no air can bubble back into the tank since the discharge pipe is always immersed in the water.

Another object is to so construct a fountain of this character that it is equipped with two openings one for air to enter located at a point so that water cannot enter therethrough and the other for the discharge of the water where air cannot get in. This prevents bubbling and riling of the water in the can during the filling operation, it also prevents riling of water in cup and makes the feed instantaneous.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a fountain constructed in accordance with this invention;

Fig. 3 is a detail perspective view of the drinking cup detached.

Fig. 4 is a horizontal section taken on the line 4—4 of Fig. 2.

Figure 2:
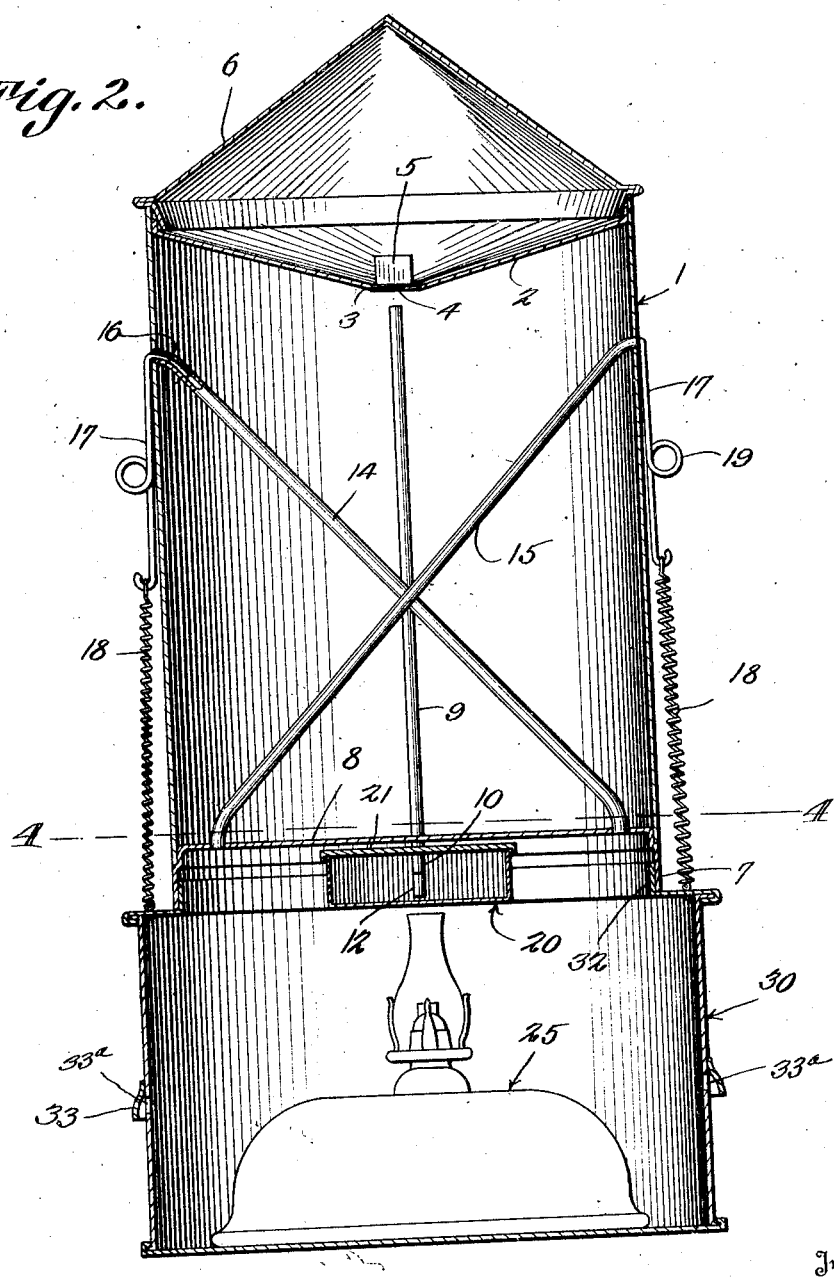
Fig. 2 is a vertical section thereof taken in a plane at right angles to the view shown in Fig. 1.

The fountain constituting this invention comprises a tank 1 which may be of any desired shape and size being preferably cylindrical to avoid the formation of corners. This tank 1 is closed throughout except for the filling opening 3 formed centrally in the top 2 thereof. This filling opening is closed by a screw plug 4 which is shown equipped with an upstanding handle 5 to facilitate its application and removal.

The top 2 which is permanently fixed in the tank is made countersunk and slants downwardly toward the opening 3 so that when water is poured into said top it will operate as a funnel for directing it into the tank.

A removable cover 6 is arranged on the top of the tank and is made substantially cone-shaped to prevent the poultry from roosting thereon, and this removable cover 6 protects the filling plug and prevents water from settling in the countersunk top 2, in case of rain or the like.

A flange 7 depends from the bottom of the tank 1 so that the bottom 8 thereof is spaced inwardly from the lower edge of said flange to adapt it to fit over the drinking cup 20 which will be hereinafter more fully described.

This flange 7 is cut out at diametrically opposite points to adapt it to fit over the ends of the drinking cup 20 which projects at opposite ends beyond the sides of the tank as is shown clearly in Fig. 1.

An air inlet pipe 9 extends from a point near the top of tank 1 down through the bottom 8 thereof into the drinking cup 20 as is shown clearly in Fig. 2. The lower end 10 of this pipe which extends below the bottom 8 is normally submerged in water in the cup 20, the water line of which is shown at L.

It will thus be seen that when this end is submerged the vacuum in the upper end of tank 1 will remain intact and immediately the end is exposed air will rush in through the pipe 9 and force the water out through a discharge faucet 11 which opens through one side wall of the tank and discharges through an extension 12 into the cup 20. The extension 12 of the faucet is always submerged in water in the cup 20 so that no air enters the tank through this faucet, this prevents any possibility of the dirt and trash in the cup 20, if there should be any, being carried back into the tank 1 through such outlet.

A bail-shaped handle 13 is preferably mounted on the upper end of the tank to facilitate lifting of the fountain from place to place.

The drinking cup 20 is her shown substantially rectangular in form and of a length greater than the diameter of tank 1 so that when in place the ends of said cup will extend some distance beyond the side walls of the tank as is shown clearly in Figs. 1 and 4. These projecting ends are exposed to permit the poultry to drink therefrom.

The cup 20 is preferably provided with a cover 21 which is fixedly secured thereto over the portion which is arranged below the bottom of tank 1 and this cover has an opening 22 therein for the passage of the projecting end 10 of the air pipe 9.

The tank 1 is also equipped with two pipes or tubes 14 and 15 which extend obliquely from the bottom 8 of the tank through one side wall thereof near the upper end and intersect each other intermediate their ends. These tubes 14 and 15 open through the bottom 8 and through the side walls and form flues for conducting heat and products of combustion from the lamp chamber 30 which is arranged below the tank and which will be presently more fully described. This arrangement of the flues 14 and 15 extending from diametrically opposite points of the bottom to diametrically opposite sides of the tank operate to supply sufficient heat to keep the contents of the tank from freezing. The upper ends of these flues 14 and 15 where they open through the side walls of the tank also operate as sockets to receive hooks 16 carried by connectors 17 which unite the upper ends of coiled springs 18 with the tank, the lower ends thereof being connected with a supporting base 30 which is made hollow to provide a lamp chamber for heating the contents of the drinking cup 20 and keeping the contents of tank 1 from freezing during cold weather.

The connectors 17 are preferably made of wire and have coils 19 formed therein which not only afford a yieldable connection but provide finger grips to apply and disengage the hooks 16 from the sockets.

The hollow supporting base 30 which is preferably constructed of sheet metal and in which a lamp 25 is designed to be mounted is provided at its upper end with an annular plate 31 around the inner edge of which extends an upstanding flange 32 over which fits the flange 7 of tank 1 as is shown clearly in Fig. 2.

The lamp 25 is arranged in the container 30 directly below the drinking cup 20 so that the heat emanating therefrom will be directly against the bottom of said cup and operate to keep the contents of the cup warm while the products of combustion passing around the bottom of said cup will pass upward through the flues 14 and 15 out to the atmosphere through the upper side walls of the tank thereof and will keep the water in the tank above the freezing point which is all that is required. It will thus be seen that a minimum amount of fuel will be required to supply a lamp of size sufficient to heat the contents of the drinking cup avoiding the necessity of directly heating the contents of tank 1. It is well known that in devices of this character the entire contents of the tank must be heated ordinarily to avoid freezing and to supply water at the proper temperature for the poultry.

The lamp container 30 is shown equipped at opposite sides with hand grips 13 to facilitate the lifting around of the container when necessary, and under which are located the ventilators 13ª for the lamp.

Is is of course understood that by use of the yieldable connectors composed of the members 17 and 18 that the supporting base or lamp container 30 is detachably connected with the tank and this container not only forms a holder for the lamp 35 but also operates to support the drinking cup 30 and the tank 1 so that the cup will be located at the proper point for drinking by the poultry and prevents straw and trash from being scratched into it.

From the above description it will be obvious that a fountain constructed as herein shown and described will not only keep the water warm in winter but will protect it from becoming contaminated from dirt in the drinking cup which often occurs, so that the tank may be filled and not refilled until all of the water has been used.

The operation of the fountain it is thought will be well understood but will be briefly described as follows. The parts being in the position shown in Figs. 1 and 2 the top 6 is removed and the plug 5 unscrewed. The water is then poured into the funnel-like top 2 and flows down through the opening 3 into the tank, the faucet 11 having first been closed. As the water enters the tank the air therein is forced out through the pipe 9 and on the insertion of the plug 5 and the opening of faucet 11 the air entering through pipe 9 will operate to break the vacuum in the vacuum chamber at the top of the tank and permit the water to flow out through the faucet into the drinking cup 20 until the end of pipe 9 is submerged. The submerging of this pipe end operates to seal it and the vacuum in the top of the tank will hold the water against outflow until the lower end of pipe 9 is again exposed which occurs by the removal of the water from the drinking fountain by the fowl or otherwise. When the water is so lowered in the drinking cup it will flow out through the faucet into the cup until the end of pipe 9 is again sealed when the supply will be cut off.

A fountain of this nature also provides a drinking fountain for all sizes of fowls from little chicks on up to maturity and the fountain proper may be detached from the base or lamp chamber 20 and the tank with cup in place set on a board or sidewalk for little chicks. The lamp and container are not needed except in winter.

I claim:—

1. In a drinking fountain, a hollow base to receive a lamp, an annular plate arranged in the upper end of said base and having an upstanding flange around its inner edge, a water containing tank having a depending flange to fit over the flange of the base, said flange having diametrically opposite registering openings, therein, a drinking cup extending transversely of the tank under the bottom thereof, and projecting through said openings, a faucet opening through the side wall of said tank and having an extension extending to a point near the bottom of the drinking cup, and an air inlet extending from the bottom of the tank to a point near the top thereof and opening through the bottom into said drinking cup with its lower end extending below the water line of the cup.

2. In a drinking fountain, a hollow base to receive a lamp, an annular plate arranged in the upper end of said base and having an upstanding flange around its inner edge, a water containing tank having a depending flange to fit over the flange of the base, said flanges having diametrically opposite registering openings therein, a drinking cup extending transversely of the tank under the bottom thereof and projecting through said openings, a faucet opening through the side wall of said tank and having an extension extending to a point near the bottom of the drinking cup, and an air inlet pipe extending from the bottom of the tank to a point near the top thereof and opening through the bottom into said drinking cup with its lower end extending below the water line of the cup, and means for detachably connecting the tank to the base.

3. In a drinking fountain, a supporting base, a tank mounted on said base, a supply means located in said base below said tank, hot air flues extending through the bottom of said tank, and through the side walls of the tank near the top thereof and resilient connectors secured at one end to said base and having hooks at their upper ends detachably engaging the upper ends of the flues whereby the tank and base are secured together.

In testimony that I claim the foregoing as my own, I have hereto affixed my signature.

CLAYTON J. PAGE.